(12) United States Patent
Fleischer et al.

(10) Patent No.: US 9,984,450 B2
(45) Date of Patent: May 29, 2018

(54) METHOD AND APPARATUS FOR ENHANCEMENT OF ULTRASOUND IMAGES BY SELECTIVE DIFFERENCING

(71) Applicant: The Trustees of Princeton University, Office of Technology and Trademark Licensing, Princeton, NJ (US)

(72) Inventors: Jason W. Fleischer, Princeton, NJ (US); Jen-Tang Lu, Princeton, NJ (US)

(73) Assignee: The Trustees of Princeton University, Office of Technology and Trademark Licensing, Princeton, NJ (US)

( * ) Notice: Subject to any disclaimer, the term of this patent is extended or adjusted under 35 U.S.C. 154(b) by 259 days.

(21) Appl. No.: 14/957,317

(22) Filed: Dec. 2, 2015

(65) Prior Publication Data

US 2016/0155221 A1  Jun. 2, 2016

Related U.S. Application Data

(60) Provisional application No. 62/086,240, filed on Dec. 2, 2014.

(51) Int. Cl.
*G06K 9/00* (2006.01)
*G06T 5/50* (2006.01)

(52) U.S. Cl.
CPC ............ *G06T 5/50* (2013.01); *G06K 2209/05* (2013.01); *G06T 2207/10016* (2013.01); *G06T 2207/10132* (2013.01); *G06T 2207/20224* (2013.01)

(58) Field of Classification Search
CPC ............. G06T 5/50; G06T 2207/20221; G06T 2207/20224; G06T 2207/10132

USPC ......................................................... 382/131
See application file for complete search history.

(56) References Cited

U.S. PATENT DOCUMENTS

| | | | | |
|---|---|---|---|---|
| 5,664,573 A | * | 9/1997 | Shmulewitz | A61B 6/502 128/915 |
| 5,971,928 A | * | 10/1999 | Dodd | G01S 7/52026 600/458 |
| 6,283,919 B1 | | 9/2001 | Roundhill et al. | |
| 6,514,206 B2 | | 2/2003 | Maxwell et al. | |

(Continued)

OTHER PUBLICATIONS

See-Ying Chiou, et al., Comparing Differential Tissue Harmonic Imaging with Tissue Harmonic and Fundamental Gray Scale Imaging of the Liver, 2007 American Institute of Ultrasound in Medicine, J Ultrasound Med 2007; 26:1557-1563.

(Continued)

*Primary Examiner* — Van D Huynh
(74) *Attorney, Agent, or Firm* — Moser Taboada (57) ABSTRACT

A computer implemented method and apparatus for processing images comprises obtaining two or more images acquired by ultrasound. One or more operating parameters of the ultrasound probe (transducer) are varied so that the resulting images of a material or object under investigation differ with respect to intensity. Examples of parameters which may be varied include probe angle, frequencies, and even the time and/or resolution of the respective images. The method further comprises creating a new image by selectively subtracting one or more images from one or more others. In an embodiment, there are two images and one is partially subtracted from the other. If negative values are obtained as a result of the subtraction, such values are set to zero.

20 Claims, 6 Drawing Sheets

(56) References Cited

U.S. PATENT DOCUMENTS

| | | | |
|---|---|---|---|
| 2001/0029336 A1* | 10/2001 | Teo | A61B 8/06 |
| | | | 600/442 |
| 2003/0055337 A1 | 3/2003 | Lin | |
| 2015/0146997 A1* | 5/2015 | Li | G06T 5/007 |
| | | | 382/274 |
| 2016/0242743 A1* | 8/2016 | Miyaki | G01S 7/52038 |

OTHER PUBLICATIONS

Kazuaki Tanabe, et al., Tissue Harmonic Imaging Experimental Analysis of the Mechanism of Image Improvement, Japanese Circulation Journal, vol. 64: 202-206, Mar. 2000.

Benoit Mesurolle, et al., Tissue Harmonic Imaging, Frequency Compound Imaging, and Conventional Imaging, Use and Benefit in Breast Sonography, 2006 American Institute of Ultrasound in Medicine, J. Ultrasound Med 2007; 26:1041-1051.

Jeff Powers, et al., Medical Ultrasound Systems, Interface Focus (2011) 1, 477-489, Published online May 18, 2011.

* cited by examiner

METHOD AND APPARATUS FOR ENHANCEMENT OF ULTRASOUND IMAGES BY SELECTIVE DIFFERENCING

CROSS-REFERENCE TO RELATED APPLICATION

This application claims benefit of U.S. Provisional Patent Application No. 62/086,240 filed Dec. 2, 2014, which is hereby incorporated in its entirety.

BACKGROUND

Field

Embodiments of the present invention generally relate to imaging systems and, more particularly, to ultrasonic imaging systems and methods of using the same.

Description of the Related Art

Ultrasound images are typically produced by generating an ultrasound wave traveling in a known direction and observing the echoes created when the sound wave bounces off of boundaries between regions of differing density in an object or passes through such regions when transmitted through the object. For any given direction, image pixels may be generated by plotting a dot whose brightness is proportional to an echo's amplitude at a coordinate whose location is a function of the time after a short pulse is sent in the direction in question. Alternatively, in the case of transmission, the image pixels may be generated by plotting the brightness of each dot according to the amplitude of the signal at the points where it is received after passing through the object.

The echoes from regions of different density, and from contrast agents such, for example, as microbubbles, are comprised of ultrasound signals at the transmitted frequency (the "fundamental frequency") as well as signals at various multiples of the transmitted frequency ("harmonics"). Apart from the fundamental frequency, the strongest harmonic signal is generally at the second harmonic or twice the fundamental frequency.

In biomedical imaging applications, which are just one example of the myriad applications of ultrasound imaging, ultrasonic beams are subject to random scattering and distortion as they travel through regions of soft tissue, especially where there are acoustic interfaces as between muscle and fat. Collectively referred to as tissue aberrations, the scattering and distortion tend to degrade the clarity of an ultrasound image. In biomedical ultrasound, the second harmonic signal has been used intensively; in this case, noise and speckle are reduced by a one-way trip from the source tissue (compared with the round trip of the fundamental frequency from the probe to the object and back), resolution is enhanced due to the shorter wavelength, and reverberations/side-lobe artifacts are decreased. Because of these considerations, the harmonic signal is used to construct the final image, while the fundamental signal is disregarded.

The inventors herein have observed that echoes at more than one frequency (e.g., at the second harmonic and one or more other frequencies such as the fundamental frequency and/or another harmonic frequency) can be combined and/or differenced selectively, i.e., in a way that produces images having greater diagnostic clarity and/or utility than images produced utilizing echoes at a single frequency and/or by blindly applying subtraction on a systematic, pixel-by-pixel basis.

SUMMARY OF THE INVENTION

A method for enhancement of images acquired by ultrasound is described. The method comprises obtaining two or more images acquired by ultrasound based on one more different parameters, such, for example, as the fundamental and harmonic frequencies, respectively, and/or correspondingly different probe angles. The method further comprises creating a new image by selectively subtracting a portion of one or more images from one or more other images or a corresponding portion of one or more other image. In an embodiment, a first image is acquired, a second image is acquired, and a portion of at least one of the images is selected. A difference is taken between the selected portion of one image and a portion of another image. A composite image is made by selectively subtracting one image from the other, using a feature-specific threshold to prevent negative values and improve local contrast.

In another embodiment, an apparatus for improvement of images acquired by ultrasound to facilitate feature identification or other analysis, the apparatus comprising at least one processor, and a memory operatively associated with the processor and configured to store instructions executable by the at least one processor. The apparatus further includes an image acquisition module comprising instructions executable by the at least one processor for obtaining multiple sets of ultrasound images and storing the images in a database, and an intensity analysis module comprising instructions executable by the at least one processor for taking the partial difference of intensities between images of respective sets of images.

While the method and apparatus is described herein by way of example for several embodiments and illustrative drawings, those skilled in the art will recognize that the method and apparatus for enhancing images acquired by ultrasound is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for enhancing images acquired by ultrasound defined by the appended claims.

Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for enhancing images acquired by ultrasound for feature identification and./or other analysis are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of ultrasound imaging systems and methods consistent with the present disclosure leverage information in the fundamental signal, rather than ignore or discard it. The fundamental frequency samples the same tissue as, for example, the second harmonic (indeed, the former may be deemed the "pump" for the latter), so that similarities and differences between the two signals can be used selectively to improve image quality even further. For certain features under investigation, subtraction may remove common noise elements, enhance boundaries due to differences in diffraction (i.e., scattering), and highlight different aspects of tissue response. Careless application of subtraction, on the other hand, is undesirable since pixel intensity values may go negative, common but important features may be lost, and gradients may be inappropriately emphasized.

Accordingly, embodiments consistent with the present disclosure apply differencing on a selective and, optionally, a locally optimized basis, such that a final image benefits, where appropriate for the feature(s) being investigated, from mutual information acquired at two or more different frequencies. For example, a fractional portion of a second image may be subtracted from a first image to obtain a series of differential pixels which can be used to construct an enhanced image. In particular, two or more different ultrasound images are obtained, wherein a first of the ultrasound images comprises pixels having intensity values influenced by a first acquisition parameter and wherein a second of the ultrasound images comprises pixels having intensity values influenced by a second acquisition parameter different than the first acquisition parameter. The respectively different acquisition parameters may include probe frequency, focus depth, probe angle, resolution, time, stress application, and combinations of the foregoing.

In an embodiment, the second acquisition parameter may comprise the fundamental frequency while the first acquisition parameter may comprise the second harmonic of the fundamental frequency. A scale factor greater than zero and less than one may be applied to localized pixels, within a region of an object under investigation, corresponding to the second image such that a partial difference is selectively taken. In some embodiments, the scale factor may be set in firmware or software while, in other embodiments, a slider or knob or other user interface element may be used by an operator to vary the magnitude of the scaling factor to be applied to pixels prior to subtraction. It is also contemplated that in some embodiments, the first acquisition parameter may comprise the fundamental frequency and the second acquisition parameter may comprise the second harmonic or vice versa.

In some embodiments, only one of the variable acquisition parameters differ between the images. By including appropriate selectors or sliders for adjustment, an operator may choose to vary some or all of the parameters. Alternatively, they may be set in firmware or software so as to be adjusted without operator involvement or awareness. The operator may select a window of interest which circumscribes an area of an object under investigation. For each of a plurality of pixels within a selected portion corresponding to the window, an intensity value associated with the second ultrasound image is subtracted from an intensity value associated with the first ultrasound image to obtain a differential intensity value. Using at least some of the differential intensity values, display of an enhanced, composite image may be initiated.

The result of selective differencing according to one or more embodiments is a composite image having lower background noise and reduced clutter and transducer saturation, but a more isolated harmonic response and better tissue selectivity.

Figure 1:
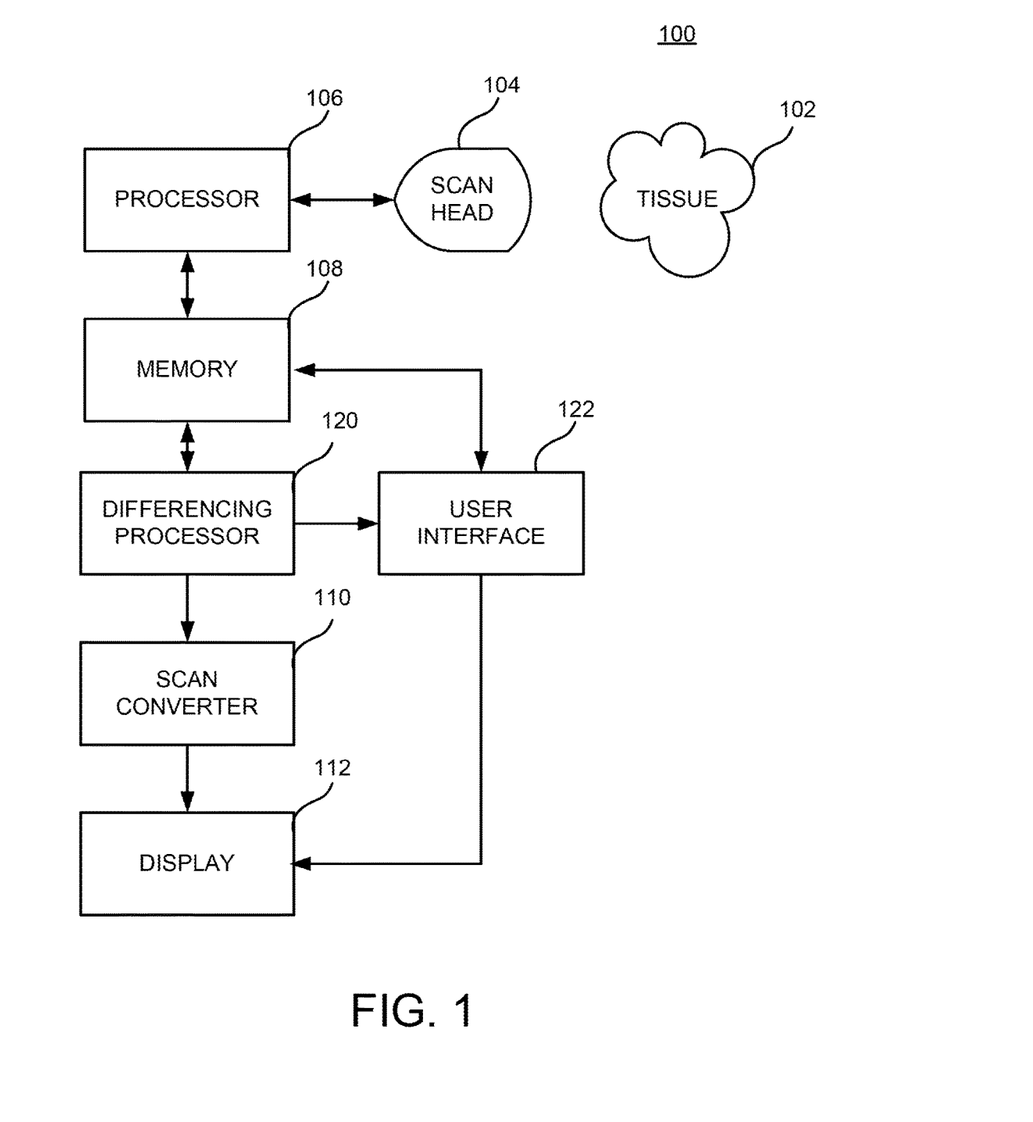
FIG. 1 depicts a block diagram of a system configured in accordance with one or more embodiments consistent with the present disclosure.

FIG. 1 illustrates a system configured in accordance with one or more embodiments consistent with the present disclosure. FIG. 1 is a block diagram of a system 100 for acquiring, storing and analyzing images obtained through ultrasound imaging, according to one or more embodiments. The tissue or object 102 being investigated as, for example, to determine the presence or absence of one or more diagnostic features is subjected to ultrasound pulses generated by a scan head 104 which includes a number of piezoelectric transducer elements. The recorded echoes are processed by a beam forming processor 106 that generates echo data for each beam direction. In some embodiments, the scan-head 104 may be configured to generate multiple probe beams simultaneously, each at a corresponding signal frequency. In other embodiments, the scan-head 104 may be configured to emit a pulse having a nominal passband which encompasses the respective frequencies to be used in exploring the tissue.

Figure 2A:
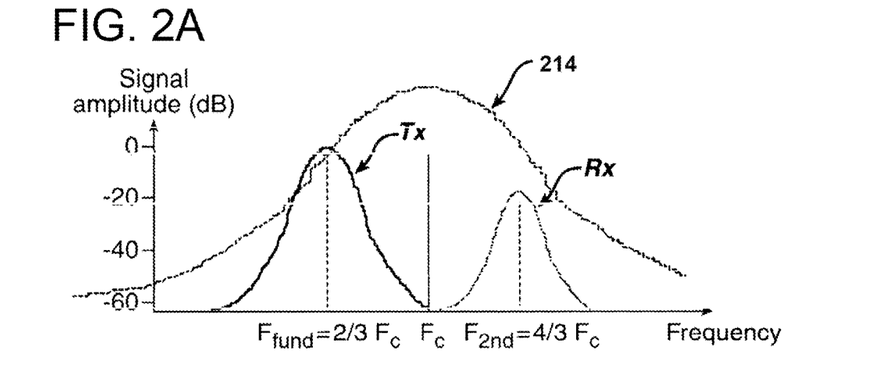
FIG. 2A depicts an exemplary passband of a scan head transducer used in the illustrative system of FIG. 1, the transducer having a nominal center frequency and the passband containing fundamental and harmonic frequency signal bands.

In FIG. 2A, there is depicted an exemplary passband 14 for scan head 104. The passband 14 contains fundamental and harmonic frequency signal bands, where Tx illustrates the fundamental frequency or transmit band, Rx illustrates a second harmonic frequency or receive band, and the passband 14 of the scan head transducer has a nominal center frequency of $F_c$. In an embodiment, the transmitted signal frequency may be on the order of two-thirds of the nominal center frequency $F_c$ of the scan head. As such, the second harmonic is four-thirds of the nominal frequency (i.e., still within the bandwidth of the scan head transducer).

Figure 2B:
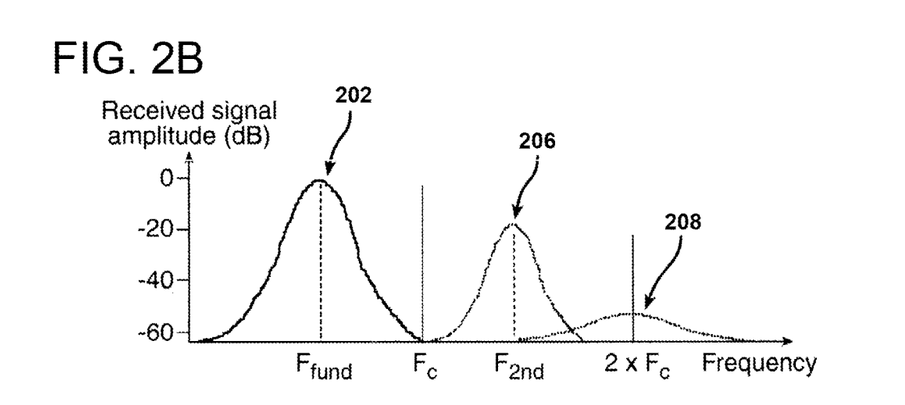
FIG. 2B depicts the fundamental and harmonic signals received by the exemplary transducer of FIG. 1.

Returning to FIG. 1, ultrasound images are typically taken in polar coordinates by scanning observing the echoes in the "r" direction for each of a number of scans at different angles, θ. The scan lines are typically saved in a rectangular array in memory 108 prior to resampling by scan converter 110 for display to the operator on display terminal 112. According to one or more embodiments, a first image corresponding to the echo returned at the second harmonic frequency Rx and a second image corresponding to the echo returned at the fundamental frequency Tx are simultaneously collected and stored in memory 108. The received signals are depicted in FIG. 2B.

With continuing reference to FIG. 1, differencing processor 120 utilizes the scan data corresponding to the respective first and second images to construct a composite image which is converted by scan converter 110 for display to an operator of system 100. In those embodiments of the present invention in which the user selects the areas to be processed by viewing the data stored in memory 108, a user interface 122 formats the data in memory 108 for display on display terminal 112. For the purposes of the following discussion the "r" measurements will assumed to be stored as the y-coordinates. The application of the selective differencing algorithm to the data r-θ data stored in memory 108 results in an enhanced image which is displayed in the usual coordinate system.

Figure 3:
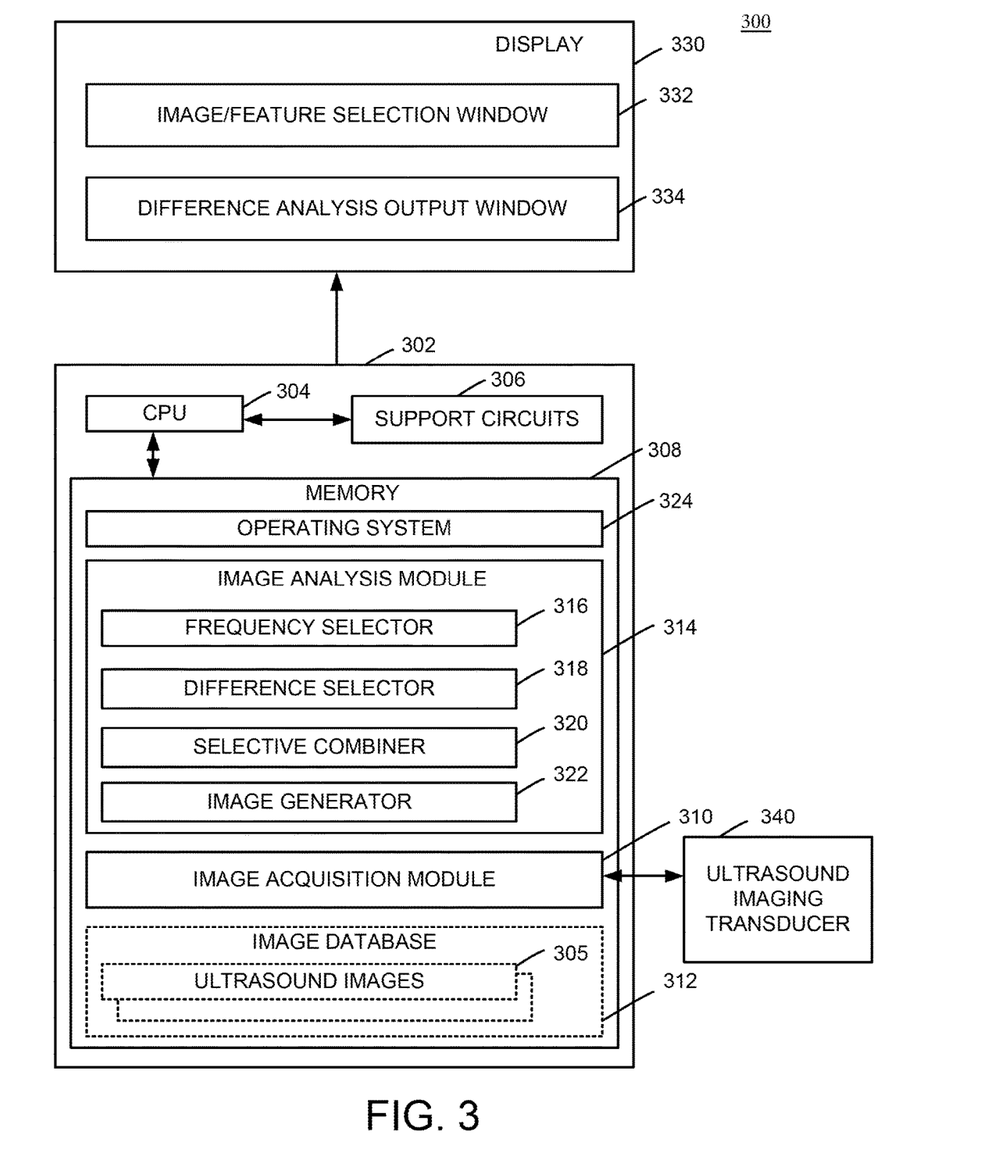
FIG. 3 depicts a block diagram of a system for enhancing images acquired by ultrasound, or for constructing new images from such images, according to one or more embodiments.

FIG. 3 illustrates a system configured in accordance with an embodiment of the present invention. FIG. 3 is a block diagram of a system 300 for acquiring, storing and analyzing images obtained through ultrasound imaging, according to one or more embodiments. The system 300 includes a computer 302. The computer 302 is a computing device, for example a desktop computer, laptop, tablet computer, and the like. The computer 302 includes a Central Processing Unit (CPU) 304, support circuits 306, and a memory 308. The CPU 304 may include one or more commercially available microprocessors or microcontrollers that facilitate data processing and storage. The various support circuits 306 facilitate the operation of the CPU 304 and include one or more clock circuits, power supplies, cache, input/output circuits, and the like. The memory 308 includes at least one of Read Only Memory (ROM), Random Access Memory (RAM), disk drive storage, optical storage, removable storage and/or the like.

The memory 308 includes an image acquisition module 310 comprising instructions executable by CPU 304 for obtaining a plurality of ultrasound images and storing the acquired ultrasound images 305 in a database 312. The memory also includes an intensity analysis module 314 comprising instructions executable by the CPU 304 for performing differential analysis between images or between respective sets of images. In an embodiment, the instructions include instructions for taking a partial difference of the intensities between one or more ultrasound image(s) comprising a first set of one or more images and one or more ultrasound images comprising a second set of images.

Image analysis module 314 includes a frequency selector 316 for setting one or more frequencies to be used in collecting respective images for selective differencing according to embodiments consistent with the present disclosure. Image analysis module 314 further includes a difference selector which, in an embodiment, may comprise one or more adjusting knobs configured to permit selective adjustment of the differencing threshold as appropriate for different tissue settings and different features under investigation, respectively.

In the exemplary embodiment of FIG. 3, image analysis module 314 further includes a selective combiner to enable the operator of system 300 to select one or more windows within the image for selective differencing and thresholding analysis consistent with embodiments of the present disclosure. While in some embodiments, windows may be selected automatically based on established parameters stored in memory, it is also contemplated that an operator may choose to highlight specific areas or regions of an image for specialized analysis depending on the presence of specific features either believed to be present or for which presence or absence is to be confirmed. Image generator 322 generates a composite image according to the application of selective differencing according to adjustments made by the operator. In some embodiments, other adjustments such as variations of the probe angle, may be made by operator manipulation of the scan head, and one or more additional images may be collected for selective differencing and output as part of the composite image produced by image generator 322.

In an embodiment, an image set selector (not shown) is responsive to a user selection made by reference to a display of one or more images of a first set of images to a display 330. When the one or more image comprising a first set of images are displayed to the screen, the user interface responds to user input made via a mouse or touch screen by positioning a differencing window at a desired position upon the screen. By appropriate input via the user interface, the user may enlarge or reduce the size of the window, as well as selectively position it. Once positioned, the user can select one or more images of the second set for partial differencing analysis. In other embodiments, the selection is made automatically, according to criteria such as the type of feature as identified by the user, the characteristics of the image, and/or as identified by image analysis or reference to a feature database.

In some embodiments, the user may vary the parameters between the images, such that a fraction of the intensity of pixels from images from the second set or one or more images are subtracted from the 100% of the intensity of the images of a first set of one or more images. In some embodiments, a database comprises images and designated differencing parameters and relative amounts which have been empirically, over time, to enable the user to derive meaningful information. For example, in an embodiment, an operator utilizing system 300 for diagnostic purposes may select a particular feature using the window positioning feature described above. Then, either by identifying a particular feature by category, the system may automatically determine the parameters of the different image sets and their respective magnitudes for differencing calculation. In another embodiment, the system itself may reference the database, and based on image analysis, select one or more differencing protocols and parameters, presenting a series of such to the user for evaluation.

The memory also includes an operating system 324. The operating system 324 may include various commercially known operating systems. A user interface is presented to the user via a display 130, providing an image feature selection window 332 enabling the user to select specific images (or sets of images) for analysis and an image analysis window 334 for viewing the image(s) resulting from differential analysis of selected images or image sets in accordance with one or more embodiments.

Figure 4:
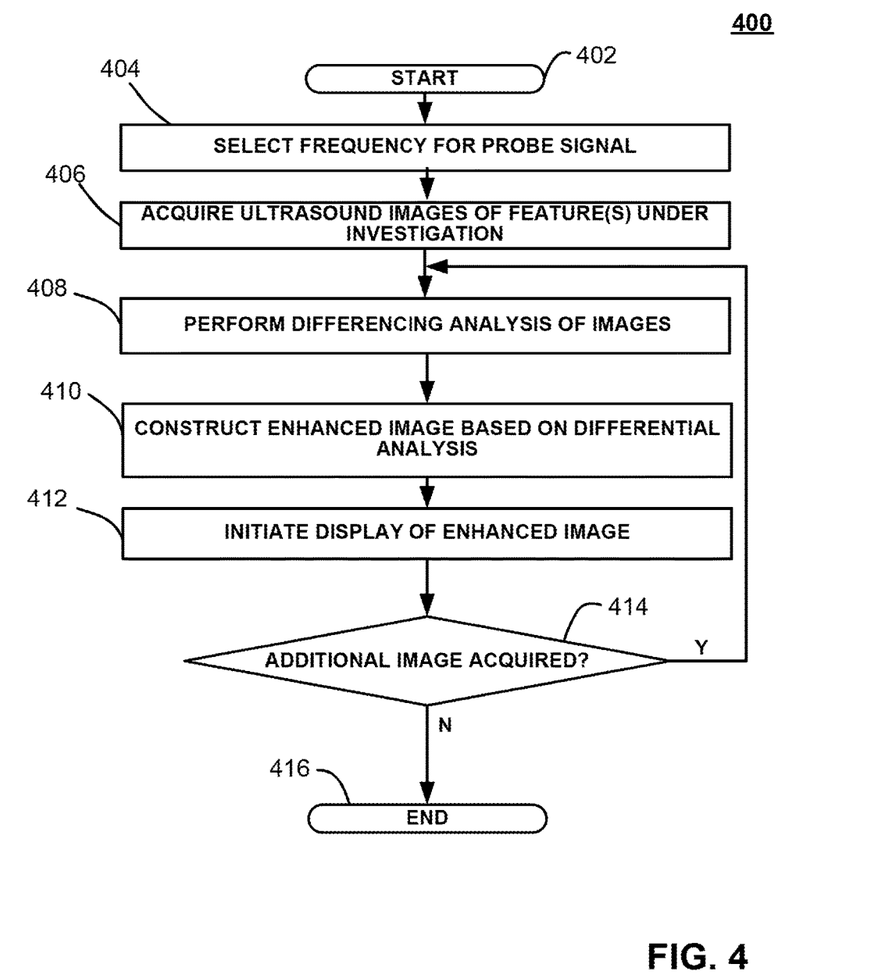
FIG. 4 depicts a flow diagram of a method for enhancing or constructing images as performed by the system of FIG. 1, according to one or more embodiments.

FIG. 4 illustrates a methodology configured in accordance with an embodiment of the present invention. Specifically, FIG. 4 depicts a flow diagram of a method 400 for constructing images as performed by a system such as that exemplified by FIG. 1 or FIG. 3. Embodiments of the present disclosure are used to identify or discriminate between different materials or objects under investigation. In some embodiments, the material under investigation may be biological tissue where images constructed by differential intensity analysis are used for diagnostic and/or evaluation purposes.

The method 400 is entered at step 402 and proceeds to step 404. At step 404, a scan head transducer frequency may be selected according to the tissue, depth, and/or features sought in an object under investigation. From step 404, the method 400 proceeds to step 406.

At step 406, two or more ultrasound images are acquired via different ultrasound transducer operating parameters or by focusing on different aspects of the same parameter. For example, between a first and second image for which a differential analysis is to be performed, a first image may be acquired at a first probe angle and a second image may be acquired at a second probe angle. Alternatively, or in addition, a pair of images to be differentially analyzed may be acquired based on the receipt of signal echoes at respectively different frequencies (e.g. the fundamental frequency vs. a harmonic frequency within the same passband).

The method 400 proceeds to step 408. At step 408, a pair or set of respective groups of images to be differentially analyzed are selected and subjected to selective differencing according to one or more embodiments. In some embodiments, a first pair of the images simultaneously acquired (e.g., those generated from return of echoes at the fundamental and a harmonic frequency) are automatically differenced without user input. In other embodiments, a user may select a first of the images containing a feature under investigation. In some embodiments, the user further defines, by operation of a user interface, a differencing window that is large enough to circumscribe the feature under investigation. The same differencing window may be specified for all images of the first set. The user may then either select a second image or set of images, or the second images or set is selected automatically based upon the selection of the first image/set and/or other criteria specified by the user (such as the type of feature suspected).

From step 408, the method 400 proceeds to step 410, where an image is constructed based on the performance of thresholding and selective differencing. At step 410, the method constructs a new image N by subtracting the intensities of a portion of the selected image(s) $I_j$ from the intensities of corresponding portions one or more other image(s) $I_2$ associated with them. In the simplest case, $N=I_1-\alpha I_2$, where $0<\alpha<1$. Better results may be achieved when the coefficient $\alpha$ varies as a function of position across the image. In more complex cases, modal decomposition, feature identification, and/or a measure of mutual information are used (e.g. $N=I_1-\alpha<I_1|I_2>$). In other embodiments, different modes or bases are used to represent the object. For a set of images, machine learning can be used, with or without user input on the training set. If negative values result from the subtraction, set them to zero.

By way of illustrative example, in the case of harmonic imaging, image $I_1$ may result from assigning pixel intensity values according to the amplitude of a signal received at the second harmonic frequency, while image $I2$ may result from assigning pixel intensity values according to the amplitude of a signal received at the fundamental frequency. However, the reverse may also be true, in which case image $I_1$ corresponds to the fundamental signal and image $I_2$ corresponds to the harmonic signal. Which order of subtraction produces a better final image depends on my factors, including (but not limited to) the image quality of each individual frame, the information content of one signal vs. the other(s), and the image quality and content of the final difference/composite image.

The method 400 proceeds to step 412 where method 400 initiates display of a first iteration of the enhanced image. Optionally, an operator may vary a parameter such as the probe angle, resulting in the acquisition of one or more additional images. In such event, method 400 determines at step 414 whether or not continued differencing and image enhancement is appropriate. If so, method 400 returns to 408 and a further iteration of steps 408 to 412 is performed. If not, the method 400 terminates at 416.

Figure 5:
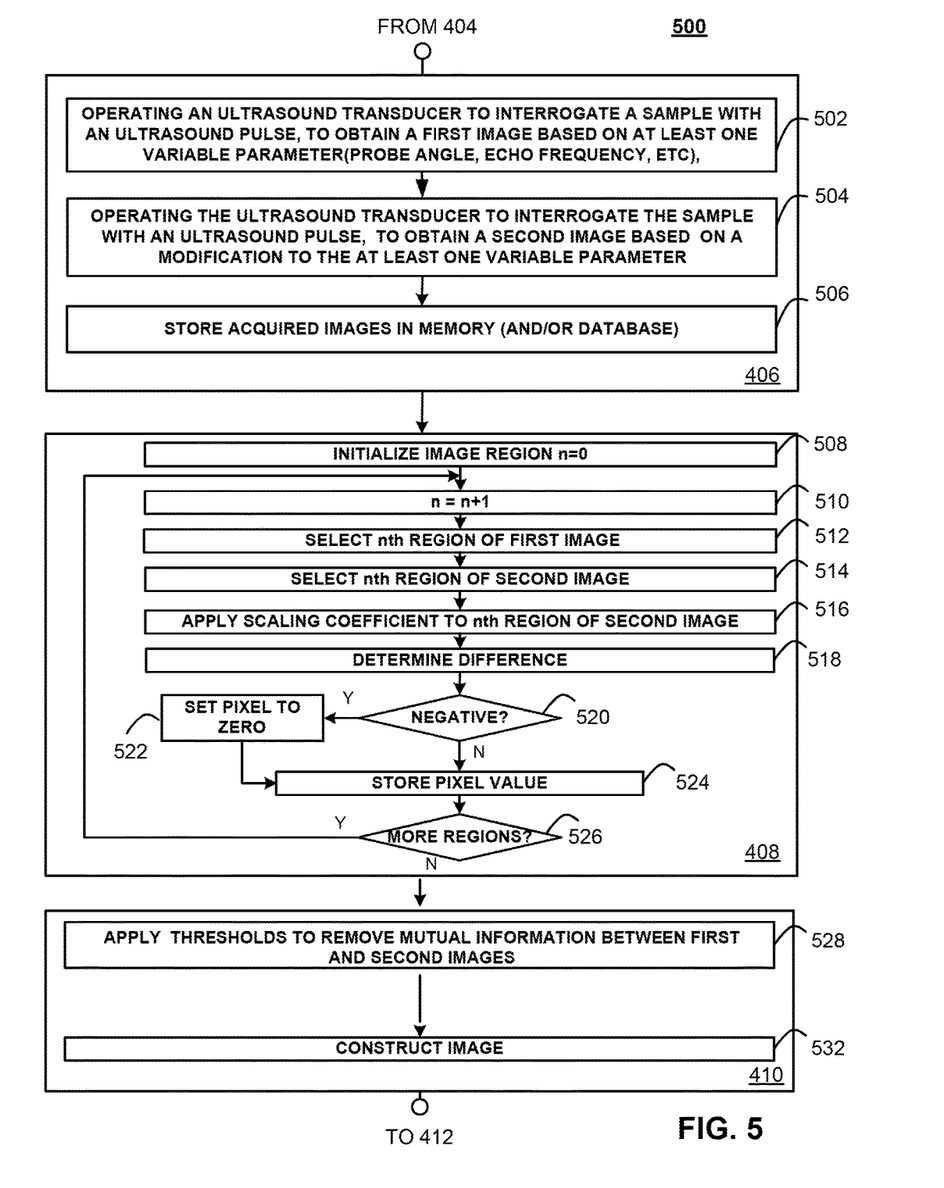
FIG. 5 depicts a flow diagram of a method for enhancing or constructing images according to FIG. 4, showing certain steps in greater detail.

FIG. 5 depicts a flow diagram of a method 500 incorporating certain steps of the illustrative method 400 depicted in FIG. 4. As seen in FIG. 5, the image acquisition step 406 includes a step 502 wherein the method 500 acquires a first image using one or more ultrasound transducers. During step 502, one or more variable parameters for operating the scan head transducer may be selected. Examples of operating parameters which may be varied among images between which selective differencing is performed, in accordance with one or more embodiments, include the probe angle, the probe frequency, and the magnitude of time gain amplification. In some embodiments, the first and second image may be reconstructed using different focus depths and/or sound speeds prior to storage in a database.

At step 504, a second ultrasound image is acquired. In some embodiments, as where echoes at the fundamental and harmonic frequency or frequencies are returned and processed to generate a second and/or additional images, steps 502 and 504 may be performed simultaneously. At step 506, the images are stored in memory so that they are available for immediate use in image processing. As well, the images may be stored in a database for subsequent processing and/or remote retrieval and analysis, either on a real time or time delayed basis.

The method 500 further includes obtaining a difference in intensities between the first and second images (and any subsequently acquired images to be included). At step 508, an image region selection counter is initialized to zero and method 500 proceeds to step 510. At step 510, the selection counter is incremented by one and the method 500 proceeds to step 512. At step 512, an initial image region of the first window—upon which selective differencing is to be performed—is selected for analysis. This selection may be made automatically based, for example, on the presence of one or more feature boundaries and/or by the presence (in one or both of the images) of an aggregation of pixels having an intensity in excess of a defined threshold. Alternatively, the selection may be made manually by an operator through the circumscription of an investigation window. The method 500 proceeds to step 514 where, a corresponding window within the second image is selected. Based on pre-established or default scaling criteria, a thresholding coefficient may be applied, in some embodiments, to pixels of the second image at step 516 and, at step 518, a difference in pixel intensities is obtained.

If, at step 520, method 500 determines that the pixel value is negative, the pixel value is set to zero at 522 and stored at step 524 for use in construction of an enhanced image. If the difference is non-negative, the difference value may be stored at step 524 without further filtering. From step 524, method 500 proceeds to step 526 where method 500 determines if there are additional regions to be analyzed via selective differencing. If so, the method returns to step 510, the region selection counter is incremented by one, and a further iteration of steps 512 to 524 is performed. If not, the method 500 proceeds to 528, where optional thresholds are applied to remove mutual information. The method 500 proceeds to 532 where the enhanced image is constructed and made available for display according, for example, to subsequent steps of process 400 (FIG. 4).

What is left after the differencing operation performed at 408, by the execution of step 532, is a final image with improved resolution, reduced noise, reduced speckle, better edge and material discrimination and/or increased contrast (depending upon the parameters varied between the images being subtracted). According to some embodiments, method returns to step 412 of method 400. Alternatively, however, display or storage of the newly constructed image may be preceded by edge detection and/or other feature extraction analysis (not shown).

In some embodiments, the differences obtained at step 408 of process 400 or 500 are obtained or created using archival images. In an embodiment, the final difference image has a threshold intensity, below which values are set to zero. In addition, negative values from said difference are set to zero. According to one or more embodiments, the fractional part of the intensity varies as a function of space or time.

An object under investigation according to one or more embodiments may be subject to two or more different stresses during acquisition of the respective images being subtracted. Moreover, the images may be acquired at different times and from different probe angles. The images used in construction of a new image by subtraction may also be displaced with respect to each other in space, and may differ in resolution as the result of deliberate, selective filtering or blurring.

Multiple images may be taken using different probe waveforms. This includes simple cases, such as a linear phase (for tilted beam angle) and quadratic phase (for focal strength and depth), to arbitrary spatial and temporal wavefunctions. These settings can be either user-controlled or automatic, covering the whole of the image or a particular region of interest.

Moreover, settings need not be optimized for image quality of a particular frame. Rather, they can adjusted so that the final difference or composite image is optimized. For example, one frame may be purposely blurred or detuned, to provide a better baseline for comparison. Possible results include sharper edges and better contrast, as well as better discrimination between materials (e.g. tissue specification).

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 6:
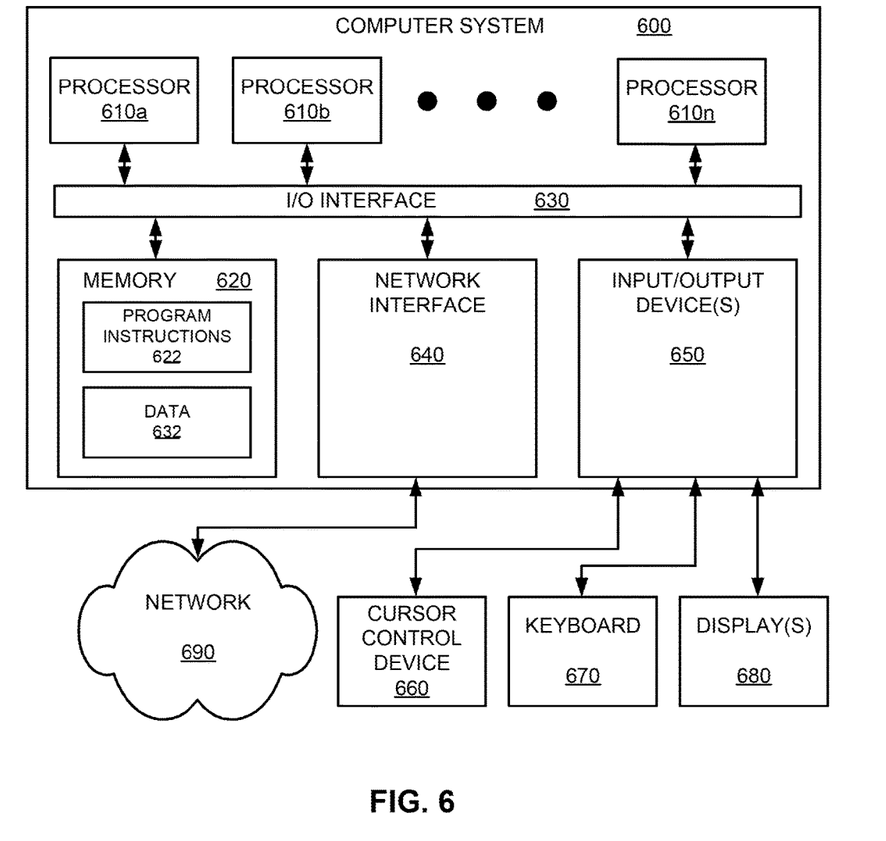
FIG. 6 is a detailed block diagram of a computer system for implementing, for example, the systems for enhancing images of FIGS. 1 and/or 3, according to one or more embodiments.

FIG. 6 is a detailed block diagram of a computer system, according to one or more embodiments, that can be utilized in various embodiments of the present invention to implement the computer and/or the display devices, according to one or more embodiments.

Various embodiments of methods and apparatus for dynamically coordinating the overall operation, specific functions and/or specific features of a system for enhancing ultrasound images according to techniques of selective differencing, as described herein, may be executed on one or more computer systems, which may interact with various other devices or even form part of one or more of the devices of an ecosystem comprising one or more scan head transducers, storage devices, processors, and display devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 860 may be configured to implement method 400 (FIG. 4) or method 500 (FIG. 5) as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more display devices (not shown), or one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more communication terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIGS. 4-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
obtaining, via an ultrasound transducer to interrogate a sample with an ultrasound pulse, two or more different ultrasound images, wherein a first of the ultrasound images comprises pixels having intensity values influenced by a first acquisition parameter, and wherein a second of the ultrasound images comprises pixels having intensity values influenced by a second acquisition parameter;
receiving a selection of a portion of at least one of the two or more different ultrasound images, the portion circumscribing an area of an object under investigation;
for each of a plurality of pixels within the selected portion, subtracting intensity values associated with the selected portion of the second ultrasound image from intensity values associated with the selected portion of the first ultrasound image to obtain differential intensity values, wherein the intensity values associated with the selected portion of the second ultrasound image are scaled by a scaling factor so as to vary as a function of space or time, and wherein a magnitude of the scaling factor to be applied is varied based on the portion of the second ultrasound image selected; and
initiating display of an enhanced image using at least some of the differential intensity values.

2. The method of claim 1, wherein the at least some intensity values associated with the second ultrasound image are decreased by the scaling factor prior to the subtracting.

3. The method of claim 2, wherein the scaling factor is between zero and one.

4. The method of claim 1, wherein the first and second acquisition parameters are respective receive frequencies following transmission of a probe signal into the object under investigation.

5. The method of claim 4, wherein the second acquisition parameter is a fundamental frequency and wherein the first acquisition parameter is the second harmonic of the fundamental frequency.

6. The method of claim 1, wherein the first acquisition parameter is a first time gain amplification and the second acquisition parameter is a second time gain amplification.

7. The method of claim 1, wherein the first acquisition parameter is a first probe angle and wherein the second acquisition parameter is a second probe angle.

8. The method of claim 1, wherein the first acquisition parameter is a first focus depth and the second acquisition parameter is a second focus depth.

9. The method of claim 1, wherein obtaining ultrasound images comprises operating transducers of a scan head to direct ultrasonic pulses at the object and to receive pulses from the object.

10. The method of claim 9, further including controlling a timing of pulse transmission so that at least one transducer transmits an ultrasonic pulse at the object before at least one other transducer transmits an ultrasonic pulse at the object so as to obtain a wavefront profile.

11. The method of claim 10, further including modifying a timing of at least some transducers of the scan head to obtain a modified wavefront profile.

12. The method of claim 1, wherein the differential intensity values are set to zero if the subtracting results in a negative value.

13. The method of claim 1 wherein the object to be measured is subject to two or more different stresses.

14. The method of claim 1 where said images are taken at different times.

15. The method of claim 1 where said images are taken at different angles.

16. The method of claim 1 where said images are displaced with respect to each other in space.

17. The method of claim 1 where the images differ in resolution.

18. The method of claim 17 where the difference in resolution is caused purposely by selective filtering or blurring.

19. The method of claim 1, wherein obtaining ultrasound images comprises operating at least one first scan head transducer to direct ultrasonic pulses at the object, and at least one second scan head transducer to receive pulses from the object.

20. A system for feature identification and improvement of images acquired by ultrasound, comprising
at least one processor;
a memory operatively associated with the processor and configured to store instructions executable by the at least one processor;
an ultrasound transducer configured to interrogate a sample with an ultrasound pulse;
an image acquisition module comprising instructions executable by the at least one processor and configured to obtain, via the ultrasound transducer, multiple sets of ultrasound images and storing the images in a database, wherein a first of the ultrasound images comprises pixels having intensity values influenced by a first acquisition parameter, and wherein a second of the ultrasound images comprises pixels having intensity values influenced by a second acquisition parameter;
a display configured to receive a selection of a portion of at least one of the two or more different ultrasound images, the portion circumscribing an area of an object under investigation; and an intensity analysis module comprising instructions executable by the at least one processor and configured to subtract intensity values associated with the selected portion of the second ultrasound image from intensity values associated with the selected portion of the first ultrasound image to obtain differential intensity values, wherein the intensity values associated with the selected portion of the second ultrasound image are scaled by a scaling factor so as to vary as a function of space or time, and wherein a magnitude of the scaling factor to be applied is varied based on the portion of the second ultrasound image selected.

* * * * *